Nov. 12, 1963  C. BRAMMING  3,110,408
ECONOMY VACUUM BOTTLE WITH PLASTIC JACKET
Filed Sept. 20, 1960
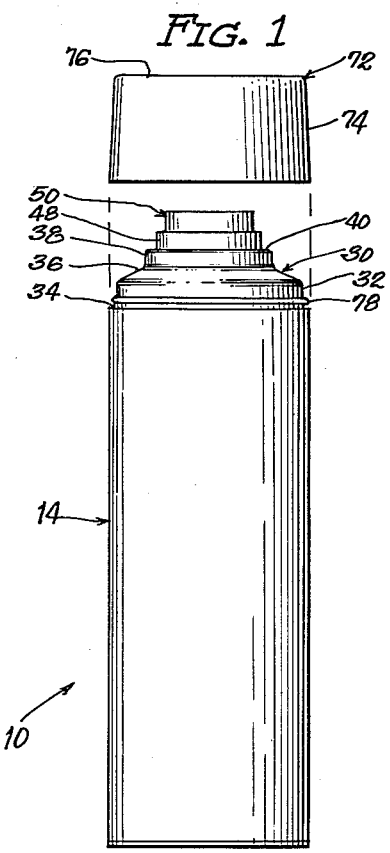
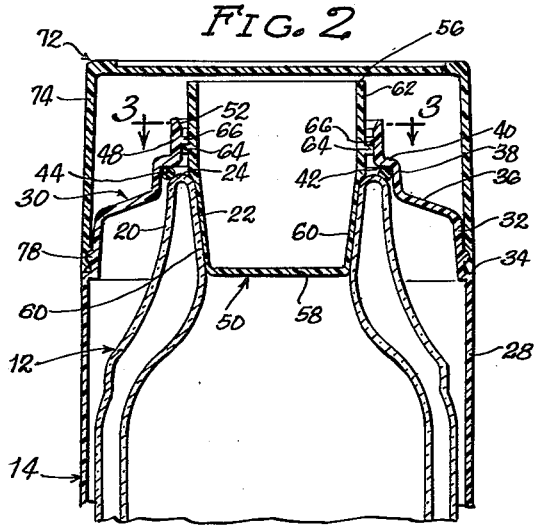
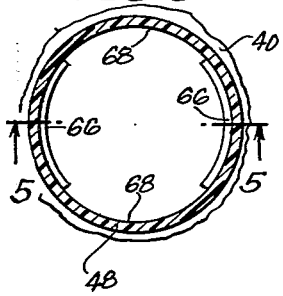
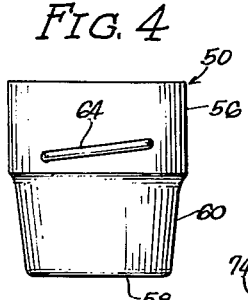
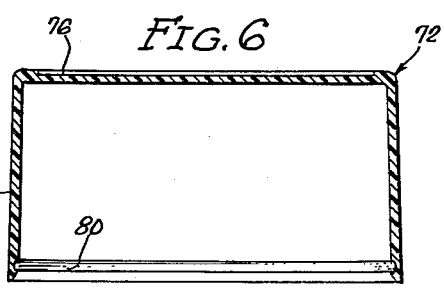
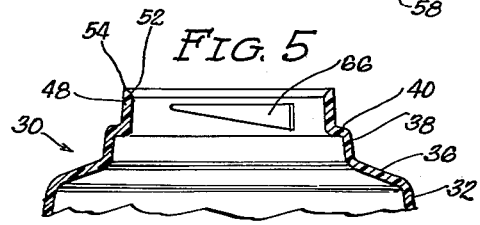
INVENTOR.
Carl Bramming
BY Ooms, McDougall,
Williams & Hersh
Attorneys

United States Patent Office 3,110,408
Patented Nov. 12, 1963

3,110,408
ECONOMY VACUUM BOTTLE WITH PLASTIC JACKET
Carl Bramming, Nashville, Tenn., assignor to Aladdin Industries, Incorporated, Chicago, Ill., a corporation of Illinois
Filed Sept. 20, 1960, Ser. No. 57,172
1 Claim. (Cl. 215—13)

This invention relates to vacuum bottles, of the type comprising a vacuum insulated receptacle received within a protective jacket.

One object of the present invention is to provide a new and improved vacuum bottle which is so economical in construction that the entire vacuum bottle may be discarded and replaced as a unit in the event that the vacuum insulated filler is broken or otherwise damaged.

A further object of the invention is to provide a new and improved vacuum bottle having a jacket that may be made very economically, entirely from resinous plastic materials.

Another object is to provide a new and improved vacuum bottle having an advantageous arrangement for closing the bottom of the jacket and supporting the vacuum insulated filler or receptacle.

A further object is to provide a new and improved vacuum bottle having a stopper or closure which is adapted to be screwed into an internally threaded portion at the upper end of the jacket, so that the stopper will be retained securely in the mouth of the vacuum insulated receptacle.

Another object is to provide a new and improved vacuum bottle having a cup which snaps onto the upper portion of the jacket to cover the stopper and the upper end of the jacket.

Still another object is to provide a new and improved vaccum bottle having a jacket which may be made entirely out of resinous plastic materials, at such a low cost that the entire vacuum bottle may economically be discarded and replaced with a new unit, in the event that the vacuum insulated receptacle or filler is broken.

Further objects and advantages of the present invention will appear from the following description, taken with the accompanying drawings, in which:

FIG. 1 is an elevational view of a vacuum bottle to be described as an illustrative embodiment of the present invention, the vacuum bottle being shown with the cup detached, for clarity of illustration.

FIG. 2 is a central longitudinal section, taken through the vacuum bottle of FIG. 1.

FIG. 3 is a fragmentary cross-sectional view, taken generally along a line 3—3 in FIG. 2.

FIG. 4 is an elevational view of the stopper for the vacuum bottle of FIGS. 1 and 2.

FIG. 5 is a fragmentary sectional view, taken generally along a line 5—5 in FIG. 3.

FIG. 6 is a sectional view taken through the cup for the vacuum bottle.

It will be seen that the drawings illustrate a vacuum bottle 10 of the type comprising a vacuum insulated receptacle or filler 12 which is received within a protective outer jacket or casing 14. The vacuum insulated receptacle 12 has inner and outer walls or shells 16 and 18 with a vacuum insulated space 19 therebetween. At its upper end, the filler 12 has a reduced portion or neck 20 formed with an open mouth 22. The inner and outer walls 16 and 18 are joined at the upper end of the vacuum insulated receptacle 12 to form a rounded upper edge portion or brim 24. Of course, the vacuum insulated receptacle 12 is normally made of glass and is quite fragile. However, it is protected by the jacket or casing 14.

In this case, it is preferred that the entire jacket 14 be made of resinous plastic materials. The illustrated jacket 14 comprises a generally cylindrical body portion 28 which surrounds the major portion of the vacuum insulated receptacle 12. At its upper end, the jacket 14 has a reduced neck or collar portion 30. It is preferred that the collar portion 30 be formed integrally with the cylindrical body portion 28, by a blow molding operation, or any other similar method. However, the collar portion 30 could be formed separately and suitably secured to the body portion 28.

As shown, the collar portion 30 has a lower cup receiving portion 32 which is slightly smaller in diameter than the body portion 28. The cup receiving portion 32 is generally cylindrical in shape, but it may taper upwardly to a slight extent, as illustrated in FIG. 2. A shoulder 34 is formed between the cup receiving portion 32 and the body portion 28.

In the illustrated construction, the cup receiving portion 32 is surmounted by an inwardly extending frusto-conical portion or flange 36, which in turn is surmounted by a reduced generally cylindrical portion 38. A flange 40 projects inwardly from the upper end of the portion 38 to form an internal shoulder 42. As shown, a suitable sealing ring or gasket 44 is interposed between the shoulder 42 and the rounded upper edge 24 of the vacuum insulated filler 12. The illustrated sealing ring 44 is circular in cross section and may be made of a soft rubberlike material, such as a vinyl plastic or synthetic rubber, for example. The sealing ring 44 prevents any liquid from leaking past the upper end of the filler 12, into the space between the filler and the jacket 14. The sealing ring 44 also cushions the upper end of the filler 12.

In the illustrated construction, the flange 40 is surmounted by a reduced generally cylindrical upper end portion 48 adapted to receive a stopper or closure 50. Around the inside of its upper end, the portion 48 has a beveled or chamfered annular surface 52, so that the portion 48 tapers to a thin or narrow upper edge 54, forming an effective pouring lip. By virtue of this construction, liquid may be poured out of the vacuum bottle without any substantial tendency for the liquid to drip or run down the side of the jacket 14.

It will be seen that the closure 50 is hollow and generally cup-shaped in form. Thus, the closure 50 comprises an annular side wall 56 and the circular bottom wall 58. The annular side wall 56 has a thin downwardly tapering lower portion 60 adapted to be received snugly in the mouth 22 of the vacuum insulated filler 12. The thin stopper portion 60 is highly flexible so that it will form an effective leak-proof seal against the mouth 22. To insure a good seal, the closure 50 is preferably made of a plastic material, such as polyethylene or polypropylene, which is soft, resilient and flexible. For strength and rigidity, the bottom wall 58 of the closure 50 is considerably thicker than the thin flexible stopper portion 60. The closure 50 has an upper side wall portion 62 which is relatively thick and rigid, to form a handle or grip. The upper portion 62 is preferably cylindrical in form.

To retain the closure 50 in the vacuum bottle, it is preferred to arrange the closure so that it will screw into the upper end portion 48 of the jacket 14. Thus, the closure 50 is preferably formed with a pair of external threads or lugs 64, adapted to mate with a pair of internal threads or lugs 66 on the upper jacket portion 48. As shown, the threads or lugs 64 and 66 are inclined so that the stopper 50 may be tightened down into the mouth 22 of the filler 12 by rotating the stopper. Gaps 68 are formed between the internal threads 66 so that the stopper 50 may readily and quickly be inserted into the mouth 22. The external threads 64 are moved downwardly between the threads 66. The stopper 50 is then rotated to move the external threads 64 under the internal threads 66. Further rotation of the stopper tightens the stopper downwardly, by the wedging action between the threads 64 and 66.

It will be seen that a cup 72 is provided to cover the closure 50 and the upper end portion 30 of the jacket 14. The cup 72 may also be employed as a drinking cup to receive the liquid contained in the vacuum bottle. As shown, the cup 72 has an annular side wall 74 and a circular bottom wall 76. Of course, the cup is inverted when it is mounted on the top of the vacuum bottle. The side wall 74 is adapted to be received around the portion 32 of the jacket 14. It will be seen that the edge or rim of the side wall 74 is engageable with the shoulder 34 on the jacket 14. When the cup 72 is on the vacuum bottle, the outer surface of the side wall 74 is flush or even with the outer surface of the cylindrical body portion 28 of the jacket.

To hold the cup 72 on the vacuum bottle, the cup receiving portion 32 of the jacket 14 is preferably formed with an outwardly projecting bead or thread 78. As shown, the bead 78 extends entirely around the jacket portion 32 and thus is annular in form. However, the bead 78 might be interrupted to form a plurality of localized projections. To receive the bead 78, the illustrated cup 72 is formed with an internal annular groove 80. By a reversal of parts, the bead 78 could be formed on the cup 72. The groove would then be formed in the jacket portion 32.

When the cup 72 is mounted on the vacuum bottle, the bead 78 snaps into the groove 80, so as to retain the cup 82 against accidental dislodgement. The cup 72 is preferably made of a soft, flexible, plastic material, such as polyethylene, for example, so that the cup may readily be mounted on and removed from the vacuum bottle. The cup 72 is readily removed by pinching the side wall 74 inwardly and then pulling the cup off the vacuum bottle.

The lower end of the jacket 14 is preferably closed by a bottom wall or member 84 which is preferably made as a separate piece and is spin welded or otherwise secured to the cylindrical body portion 28 of the jacket 14. It will be seen that the bottom member 84 comprises a circular disk 86 which is upwardly dished and thus is generally in the form of an inverted saucer. However, the bottom member 84 is preferably made of a somewhat flexible resilient plastic material. An upwardly projecting flange 88 is formed on the disk 86 near its outer edge and is adapted to be inserted into the lower end of the cylindrical body portion 28 of the jacket 14. By producing relative rotation between the cylindrical body portion 28 and the bottom member 84, enough heat may be generated in a few seconds to weld the bottom member 84 to the cylindrical member 28. Of course, it would also be possible to employ a suitable adhesive to secure the bottom member 84 to the cylindrical member 28.

The circular disk 86 has a flat central portion 90 which is surmounted by a generally cylindrical sleeve 92. It will be seen that the upper end of the annular sleeve 92 engages and supports the lower end of the vacuum insulated filler 12. As shown, the filler 12 is formed with a fragile tubulation or tip 94 which extends downwardly from the outer wall 18 along the axis of the filler 12. The sleeve 92 performs the important additional function of enclosing the fragile tip 94 and protecting it from being broken. Thus, the sleeve 92 acts as both a filler support and a tip protector. The filler 12 has a dome-shaped lower portion 96 which tends to center itself within the open upper end of the sleeve 92.

In addition to closing the lower end of the jacket 14, the circular disk 86 is flexible and resilient enough to act as a spring, resiliently supporting the lower end of the filler 12 and pressing the filler upwardly into firm engagement with the sealing ring or gasket 44. The upwardly arching or dome-shaped disk 86 is capable of flexing to accommodate fillers which vary in length to some extent. Within normal manufacturing tolerances, significant variations in the lengths of the fillers are experienced. A filler of normal length will press the disk 86 downwardly to a moderate extent. When an extra long filler is encountered, the disk 86 will be flexed downwardly to a greater extent. An extra short filler will flex the disk 86 less than the normal amount. In any case, the resilient flexing action of the disk 86 supports the filler 12 in a firm manner, yet cushions it to prevent breakage due to the normal shock incident to ordinary handling of the vacuum bottle.

Since the bottom closure member 84 is spin welded or otherwise permanently secured to the jacket 14, the entire vacuum bottle is discarded if the vacuum insulated filler should be broken by some severe shock. The vacuum bottle is then replaced with an entirely new unit. However, the jacket construction is so low in cost that this may be done on an economical basis. Moreover, the user of the vacuum bottle is saved the trouble and difficulty of obtaining and installing a new filler to replace the broken filler.

Various other modifications, alternative constructions and equivalents may be employed without departing from the true spirit and scope of the invention, as exemplified in the foregoing description and defined in the following claim.

I claim:

In a vacuum bottle, the combination comprising a vacuum insulated receptacle having a reduced neck portion at its upper end, said receptacle having a lower end wall formed with a centrally disposed fragile tubulation projecting downwardly therefrom, a resinous plastic jacket having a cylindrical side wall mounted around said vacuum insulated receptacle, said jacket having a reduced collar portion formed integrally with said cylindrical side wall and enclosing said neck portion of said receptacle, said collar portion having annular sealing means engaging said neck portion, an upwardly convex flexible and resilient resinous plastic disk seated against the lower end of said cylindrical side wall and bonded thereto, said disk being in the shape of an inverted dish, and a centrally disposed sleeve formed integrally with said disk and projecting upwardly therefrom, said sleeve surrounding and protecting said tubulation and resiliently supporting said lower end wall of said receptacle, said disk flexing to accommodate any variations in the length of said receptacle.

References Cited in the file of this patent

UNITED STATES PATENTS

| | | |
|---|---|---|
| 1,000,172 | Hopkins | Aug. 8, 1911 |
| 2,024,065 | Schellens | Dec. 10, 1935 |
| 2,713,435 | Venis | July 19, 1955 |
| 2,742,169 | Bramming | Apr. 17, 1956 |

FOREIGN PATENTS

| | | |
|---|---|---|
| 773,566 | France | Sept. 3, 1934 |
| 638,669 | Germany | Nov. 20, 1936 |
| 558,868 | Belgium | July 31, 1957 |
| 568,822 | Belgium | July 15, 1958 |